United States Patent
Ji et al.

(10) Patent No.: US 9,081,515 B2
(45) Date of Patent: Jul. 14, 2015

(54) CLOCK GENERATION CIRCUIT AND CLOCK GENERATION SYSTEM USING THE SAME

(71) Applicant: SK hynix Inc., Icheon-si Gyeonggi-do (KR)

(72) Inventors: Jung Hwan Ji, Icheon-si (KR); Geun Il Lee, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 85 days.

(21) Appl. No.: 13/845,586

(22) Filed: Mar. 18, 2013

(65) Prior Publication Data
US 2014/0176209 A1  Jun. 26, 2014

(30) Foreign Application Priority Data
Dec. 24, 2012  (KR) .................. 10-2012-0151739

(51) Int. Cl.
*H03L 7/00*  (2006.01)
*G06F 1/08*  (2006.01)

(52) U.S. Cl.
CPC ........................................ *G06F 1/08* (2013.01)

(58) Field of Classification Search
CPC .................................................. H03L 7/0993
See application file for complete search history.

(56) References Cited

U.S. PATENT DOCUMENTS

| | | | |
|---|---|---|---|
| 6,297,705 B1 * | 10/2001 | Williams et al. | 331/44 |
| 6,362,668 B1 * | 3/2002 | Lutley et al. | 327/113 |
| 7,633,348 B2 * | 12/2009 | Lin et al. | 331/44 |
| 7,830,216 B1 * | 11/2010 | Seth et al. | 331/177 R |
| 2004/0000939 A1 * | 1/2004 | Meguro | 327/160 |
| 2008/0100388 A1 * | 5/2008 | Lin et al. | 331/44 |
| 2009/0132884 A1 * | 5/2009 | Suda et al. | 714/744 |
| 2010/0156476 A1 * | 6/2010 | Obkircher | 327/119 |
| 2010/0177588 A1 * | 7/2010 | Kaiwa et al. | 365/233.11 |
| 2011/0204945 A1 * | 8/2011 | Wagner et al. | 327/160 |
| 2014/0015579 A1 * | 1/2014 | Shkolnik et al. | 327/160 |

FOREIGN PATENT DOCUMENTS

| | | |
|---|---|---|
| KR | 100214783 B1 | 5/1999 |
| KR | 100594031 B1 | 6/2006 |

* cited by examiner

*Primary Examiner* — Lincoln Donovan
*Assistant Examiner* — Khareem E Almo
(74) *Attorney, Agent, or Firm* — William Park & Associates Ltd.

(57) ABSTRACT

A clock generation circuit includes a counting code generation unit configured to generate counting codes corresponding to a frequency of an input clock when an enable signal is enabled; a control code generation unit configured to decode the counting codes and generate control codes; and a cycle changeable oscillation unit configured to determine a frequency of an output clock in response to the control codes.

20 Claims, 4 Drawing Sheets

CLOCK GENERATION CIRCUIT AND CLOCK GENERATION SYSTEM USING THE SAME

CROSS-REFERENCES TO RELATED APPLICATION

The present application claims priority under 35 U.S.C. §119(a) to Korean application number 10-2012-0151739, filed on Dec. 24, 2012, in the Korean Intellectual Property Office, which is incorporated herein by reference in its entirety.

BACKGROUND

1. Technical Field

Various embodiments relate to a semiconductor integrated circuit, and more particularly, to a clock generation circuit.

2. Related Art

A semiconductor integrated circuit is designed to operate in synchronization with a clock which is inputted from an outside. Research has been continuously conducted to improve the operation speed of a semiconductor integrated circuit, and currently, a semiconductor integrated circuit is designed to operate by receiving a clock with a high frequency.

However, test equipment for testing a semiconductor integrated circuit operates using a clock with a frequency lower than the semiconductor integrated circuit.

Therefore, a semiconductor integrated circuit is designed such that, in a test, the semiconductor integrated circuit receives a clock with a low frequency, generates a clock with a high frequency and uses the generated clock in an operation of the semiconductor integrated circuit.

Referring to FIG. 1, a conventional clock generation circuit includes a first frequency division unit 10, a frequency comparison unit 20, a charge pump 30, a voltage control oscillator 40, and a second frequency division unit 50.

The first frequency division unit 10 divides an input clock CLK_in and generates a reference clock CLK_ref.

The frequency comparison unit 20 compares the frequencies of the reference clock CLK_ref and a feedback clock CLK_fb, and generates a frequency comparison signal Fre_com.

The charge pump 30 generates a charge pumping voltage V_cp in response to the frequency comparison signal Fre_com.

The voltage control oscillator 40 generates an output clock CLK_out in response to the voltage level of the charge pumping voltage V_cp.

The second frequency division unit 50 divides the output clock CLK_out and generates the feedback clock CLK_fb.

The conventional clock generation circuit configured in this way determines the frequency of the output clock CLK_out according to the division ratios of the first frequency division unit 10 and the second frequency division unit 50 (the division ratio of the second frequency division unit 50/the division ratio of the first frequency division unit 10). For example, when assuming that the first frequency division unit 10 generates the reference clock CLK_ref by dividing by 5 the frequency of the input clock CLK_in and the second frequency division unit 50 generates the feedback clock CLK_fb by dividing by 10 the frequency of the output clock CLK_out, the frequency of the output clock CLK_out becomes two times the frequency of the input clock CLK_in.

However, in the conventional clock generation circuit, the voltage level of the charge pumping voltage V_cp is raised and lowered in response to information on a frequency difference between the input clock CLK_in and the output clock CLK_out. In addition, the frequency of the output clock CLK_out is determined according to the voltage level of the charge pumping voltage V_cp. That is to say, in the conventional clock generation circuit, since the frequency difference is converted into the type of an analog voltage and the frequency of the output clock CLK_out is determined according to the level of the analog voltage, if the voltage level of the charge pumping voltage V_cp changes according to a voltage level variation of a driving voltage used in the conventional clock generation circuit, the frequency of the output clock CLK_out is likely to be influenced.

SUMMARY

In one embodiment of the present invention, a clock generation circuit may include: a counting code generation unit configured to generate counting codes corresponding to a frequency of an input clock when an enable signal is enabled; a control code generation unit configured to decode the counting codes and generate control codes; and a cycle changeable oscillation unit configured to determine a frequency of an output clock in response to the control codes.

In another embodiment of the present invention, a clock generation circuit may include: a counting code generation unit configured to generate first codes and second codes in response to an oscillator signal and an input clock when an enable signal is enabled, and output the second codes as counting codes; a control code generation unit configured to decode the counting codes and generate control codes; and a cycle changeable oscillation unit configured to determine a delay time in response to the control codes, and generate an output clock which has a cycle corresponding to the determined delay time.

BRIEF DESCRIPTION OF THE DRAWINGS

Features, aspects, and embodiments are described in conjunction with the attached drawings, in which.

DETAILED DESCRIPTION

Hereinafter, a clock generation circuit according to the present invention will be described below with reference to the accompanying drawings through exemplary embodiments.

Figure 1:
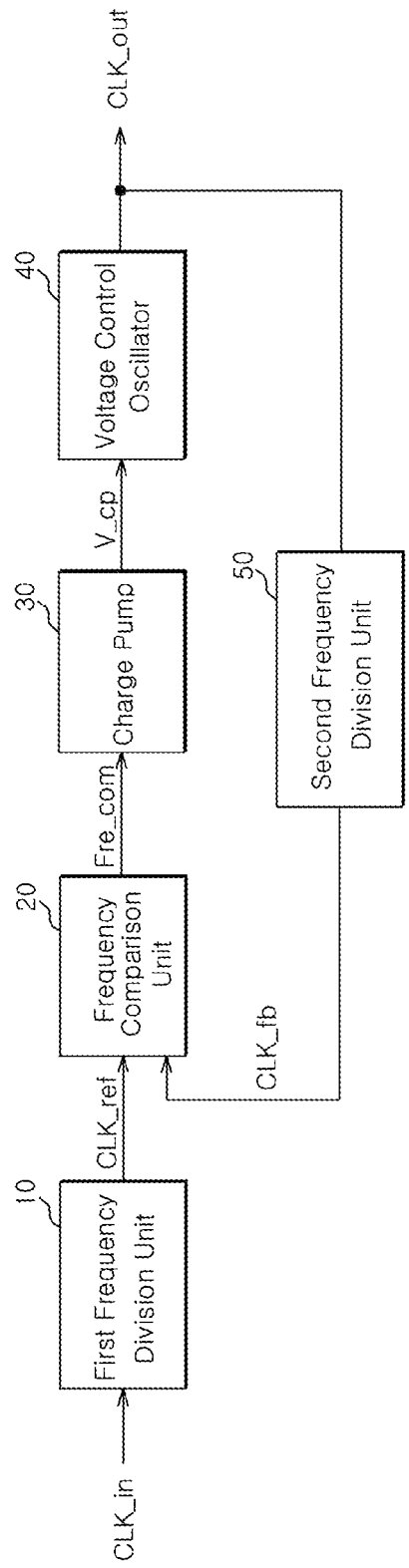
FIG. 1 is a configuration diagram of a conventional clock generation circuit.
Figure 2:
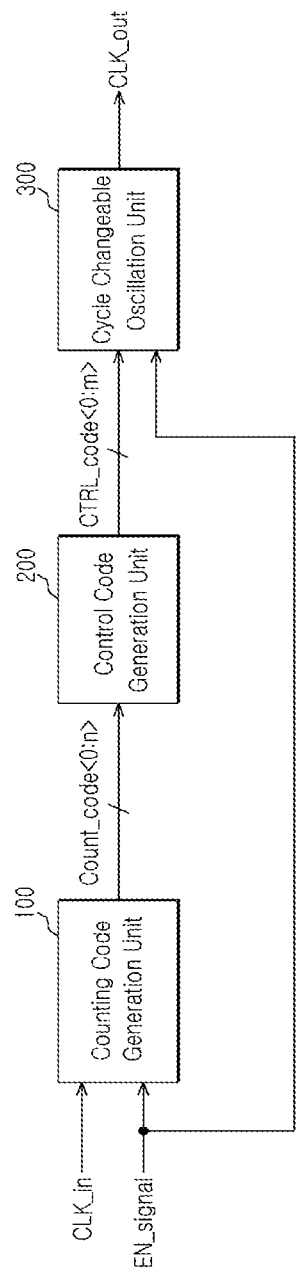
FIG. 2 is a configuration diagram of a clock generation circuit in accordance with an embodiment of the present invention.

Referring to FIG. 2, a clock generation circuit in accordance with an embodiment of the present invention may include a counting code generation unit 100, a control code generation unit 200, and a cycle changeable oscillation unit 300.

The counting code generation unit 100 may be configured to generate counting codes Count_code<0:n> corresponding to the frequency of an input clock CLK_in when an enable signal EN_signal is enabled.

The control code generation unit 200 may be configured to is decode the counting codes Count_code<0:n> and generate control codes CTRL_code<0:m>. For example, the control code generation unit 200 may decode the counting codes Count_code<0:n> and enables one bit signal CTRL_code<i> among a plurality of bit signals CTRL_code<0>, CTRL_code<1>, ... and CTRL_code<m> which may be included in the control codes CTRL_code<0:m>.

The cycle changeable oscillation unit 300 may be configured to determine the frequency of an output clock CLK_out in response to the control codes CTRL_code<0:m>.

Figure 3:
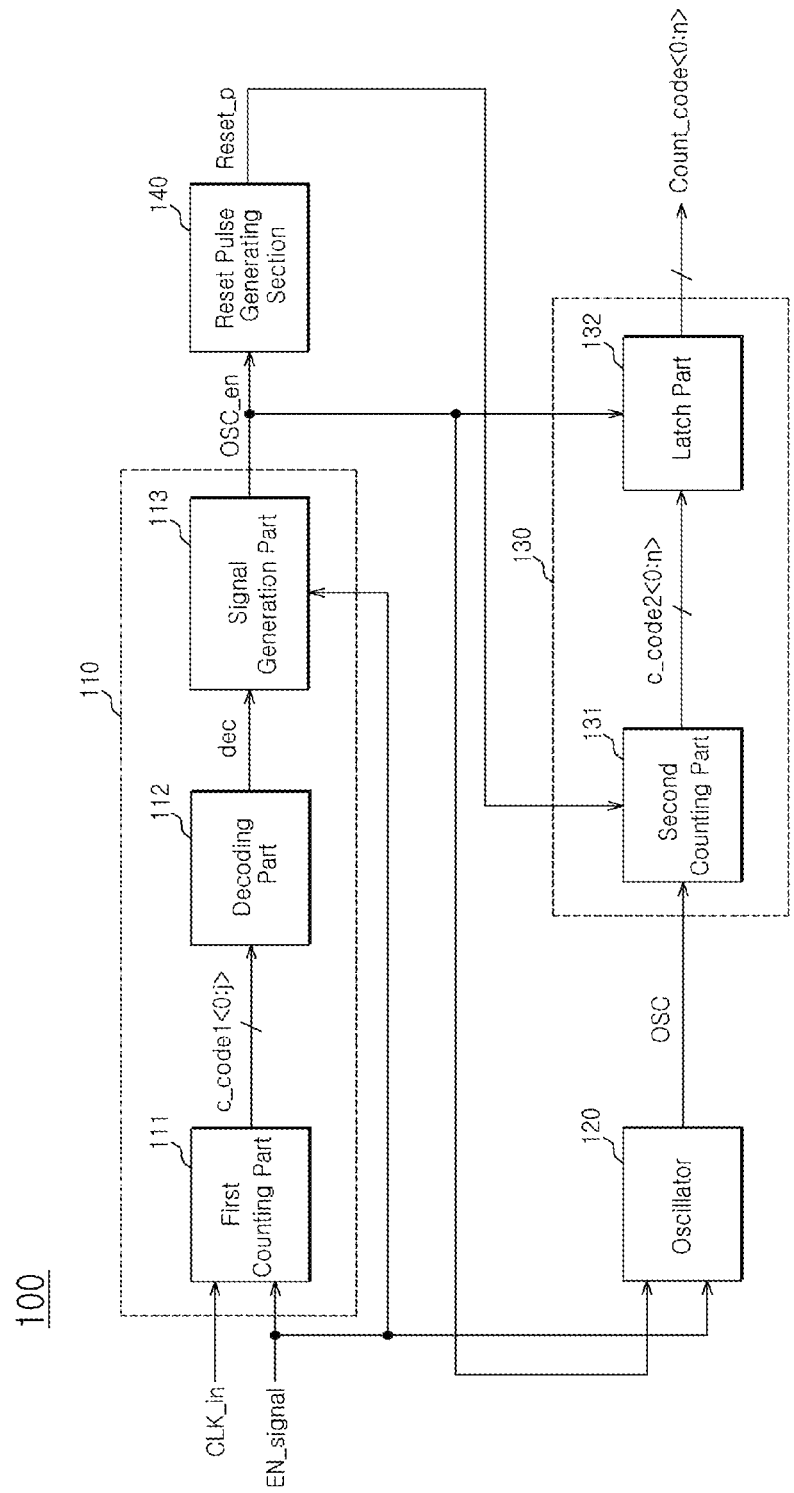
FIG. 3 is a configuration diagram of the counting code generation unit of FIG. 2.

Referring to FIG. 3, the counting code generation unit 100 may include an oscillator enable signal generating section 110, an oscillator 120, a code generating section 130, and a reset pulse generating section 140.

The oscillator enable signal generating section 110 may be configured to generate an oscillator enable signal OSC_en which has an enable period corresponding to the frequency of the input clock CLK_in, when the enable signal EN_signal is enabled.

The oscillator enable signal generating section 110 may include a first counting part 111, a decoding part 112, and a signal generation part 113.

The first counting part 111 may be configured to generate first codes c_code1<0:j> in response to the input clock CLK_in when the enable signal EN_signal is enabled. For example, the first counting part 111 may increase the code value of the first codes c_code1<0:j> each time the input clock CLK_in transitions to a specified level (for example, a high level) when the enable signal EN_signal is enabled. Also, the first counting part 111 may initialize the counted first codes c_code1<0:j> when the enable signal EN_signal is disabled.

The decoding part 112 may be configured to decode the first codes c_code1<0:j> and generate a decoding signal dec. For example, the decoding part 112 may enable the decoding signal dec when the code value of the first codes c_code1<0:j> is equal to or larger than a preset code value.

The signal generation part 113 may be configured to enable the oscillator enable signal OSC_en when the enable signal EN_signal is enabled and disable the oscillator enable signal OSC_en when the decoding signal dec is enabled.

Therefore, the oscillator enable signal generating section 110 may generate the oscillator enable signal OSC_en of which enable period is shorter when the frequency of the input clock CLK_in is high than when the frequency of the input clock CLK_in is low.

The oscillator 120 may be configured to generate an oscillator signal OSC in response to the enable signal EN_signal and the oscillator enable signal OSC_en. For example, the oscillator 120 may generate the oscillator signal OSC when both the enable signal EN_signal and the oscillator enable signal OSC_en are enabled.

The code generating section 130 may be configured to count the oscillator signal OSC and generate the counting codes Count_code<0:n>.

The code generating section 130 may include a second counting part 131 and a latch part 132.

The second counting part 131 may be configured to generate second codes c_code2<0:n> in response to the oscillator signal OSC. For example, the second counting part 131 may increase the code value of the second codes c_code2<0:n> each time the oscillator signal OSC transitions to a specified level (for example, a high level). Also, the second counting part 131 may initialize the counted second codes c_code2<0:n> when a reset pulse Reset_p is inputted.

The latch part 132 may be configured to receive and latch the second codes c_code2<0:n> when the oscillator enable signal OSC_en is enabled and output the second codes c_code2<0:n> as the counting codes Count_code<0:n> when the oscillator enable signal OSC_en is disabled.

The reset pulse generating section 140 may be configured to generate the reset pulse Reset_p when the osillator enable signal OSC_en is disabled.

Figure 4:
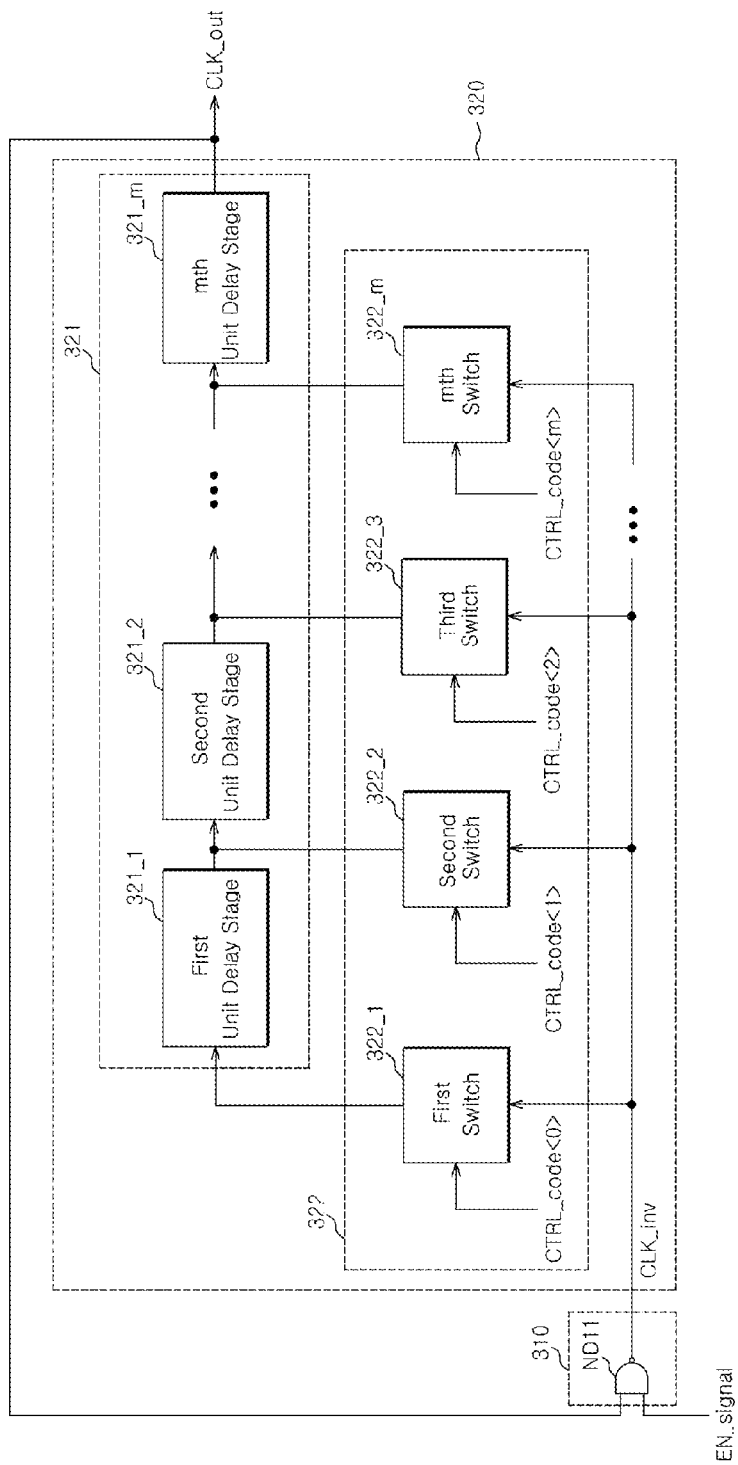
FIG. 4 is a configuration diagram of the cycle changeable oscillation unit of FIG. 2.

Referring to FIG. 4, the cycle changeable oscillation unit 300 may include an inverting control section 310 and a variable delaysection 320.

The inverting control section 310 may be configured to invert the output clock CLK_out when the eable signal EN_signal is enabled and output an inverted clock CLK_inv.

The inverting control section 310 may include a NAND gate ND11. The NAND gate ND11 may receive the enable signal EN_signal and the output clock CLK_out, and output the inverted clock CLK_inv.

The variable delay section 320 may be configured to determine a delay time in response to the control codes CTRL_code<0:m>, delay the inverted clock CLK_inv by the predetermined delay time, and output the output clock CLK_out.

The variable delay section 320 may include a delay part 321 and an input selection part 322.

The delay part 321 may include a plurality of unit delay stages 321_1, 321_2, ... and 321_m which are coupled in series.

The input selection part 322 may be configured to input the inverted clock CLK_inv to one unit delay stage among the plurality of unit delay stages 321_1, 321_2, ... and 321_m in response to the control codes CTRL_code<0:m>.

The input selection part 322 may include a plurality of switches 322_1, 322_2, 322_3, ... and 322_m. The plurality of switches 322_1, 322_2, 322_3, ... and 322_m are respectively coupled to the input terminals of the plurality of unit delay stages 321_1, 321_2, ... and 321_m. Also, the plurality of switches 322_1, 322_2, 322_3, ... and 322_m receive the respective bit signals of the control codes CTRL_code<0:m>. Since the control codes CTRL_code<0:m> are constituted by the plurality of bit signals CTRL_code<0>, CTRL_code<1>, ... and CTRL_code<m> among which only one bit signal CTRL_code<i> is enabled, only one switch among the plurality of switches 322_1, 322_2, 322_3, ... and 322_m may be turned on. The switch which is turned on may transfer the inverted clock CLK_inv to a unit delay stage which is coupled thereto.

The clock generation circuit in accordance with the embodiment of the present invention, configured as mentioned above, operates as follows.

Referring to FIG. 2, the counting code generation unit 100 may generate the counting codes Count_code<0:n> corresponding to the frequency of the input clock CLK_in when the enable signal EN_signal is enabled. For example, the counting code generation unit 100 may decrease the code value of the counting codes Count_code<0:n> as the frequency of the input clock CLK_in rises when the enable signal EN_signal is enabled. Conversely, the counting code generation unit 100 may increase the code value of the counting codes Count_code<0:n> as the frequency of the input clock CLK_in falls when the enable signal EN_signal is enabled.

The control code generation unit 200 may decode the counting codes Count_code<0:n> and generate the control codes CTRL_code<0:m>. The control codes CTRL_code<0:m> may include the plurality of bit signals CTRL_code<0>, CTRL_code<1>, ... and CTRL_code<m>, and the control code generation unit 200 may enable one bit signal CTRL_code<i> among the plurality of bit signals CTRL_code<0>, CTRL_code<1>, ... and CTRL_code<m> in response to the counting codes Count_code<0:n>.

The cycle changeable oscillation unit 300 may determine the frequency of the output clock CLK_out in response to the control codes CTRL_code<0:m>, and output the output clock CLK_out of which frequency is determined.

Operations of the counting code generation unit 100 will be described in detail with reference to FIG. 3.

The counting code generation unit 100 may include the oscillator enable signal generating section 110, the oscillator 120, the code generating section 130, and the reset pulse generating section 140.

The oscillator enable signal generating section 110 may enable the oscillator enable signal OSC_en when the enable signal EN_signal is enabled. The oscillator enable signal generating section 110 may increase the code value of the first codes c_code1<0:j> each time the input clock CLK_in transitions to the specified level after the enable signal EN_signal is enabled. If the code value of the first codes c_code1<0:j> is equal to or larger than the preset code value, the decoding signal dec is enabled. If the decoding signal dec is enabled, the oscillator enable signal OSC_en which is enabled is disabled.

Therefore, the oscillator enable signal generating section 110 may enable earlier the decoding signal dec when the frequency of the input clock CLK_in is high than when the frequency of the input clock CLK_in is low, and advance the disable timing of the oscillator enable signal OSC_en.

As a result, the oscillator enable signal generating section 110 may shorten the enable period of the oscillator enable signal OSC_en as the frequency of the input clock CLK_in rises. Conversely, the oscillator enable signal generating section 110 may lengthen the enable period of the oscillator enable signal OSC_en as the frequency of the input clock CLK_in falls.

The oscillator 120 may generate the oscillator signal OSC when both the enable signal EN_signal and the oscillator enable signal OSC_en are enabled.

The code generating section 130 may increase the code value of the second codes c_code2<0:n> each time the oscillator signal OSC transitions to the specified level, and output the second codes c_code2<0:n> as the counting codes Count_code<0:n>.

The reset pulse generating section 140 may generate the reset pulse Reset_p when the oscillator enable signal OSC_en is disabled, and initialize the code value of the second codes c_code2<0:n> which are counted.

As a result, the counting code generation unit 100 may increase the code value of the second codes c_code2<0:n> from a time when the enable signal EN_signal is enabled, and output the counted second codes c_code2<0:n> as the counting codes Count_code<0:n> when a preset number of times of the cycle of the input clock CLK_in lapse. In detail, the counting code generation unit 100 may increase the code value of the first codes c_code1<0:j> each time the input clock CLK_in transitions to the specified level when the enable signal EN_signal is enabled. In addition, the counting code generation unit 100 may increase the code value of the second codes c_code2<0:n> each time the oscillator signal OSC transitions to the specified level when the enable signal EN_signal is enabled. The second codes c_code2<0:n> when the code value of the first codes c_code1<0:j> is the preset code value are outputted as the counting codes Count_code<0:n>.

The counting codes Count_code<0:n> generated in this way may be decoded in the control code generation unit 200 and generated as the control codes CTRL_code<0:m>.

The cycle changeable oscillation unit 300 may change the frequency of the output clock CLK_out in response to the control codes CTRL_code<0:m>. Operations of the cycle changeable oscillation unit 300 will be described below.

The control codes CTRL_code<0:m> may be constituted by the plurality of bit signals CTRL_code<0>, CTRL_code<1>, . . . and CTRL_code<m> among which only one bit signal CTRL_code<i> is enabled.

FIG. 4 further describes the cycle changeable oscillation unit 300. Referring to FIG. 4, the inverting control section 310 may invert the output clock CLK_out when the enable signal EN_signal is enabled and output the inverted clock CLK_inv.

The delay part 321 may include the plurality of unit delay stages 321_1, 321_2, . . . and 321_m which are coupled in series, and may delay and output the inverted clock CLK_inv which is inputted to one unit delay stage among the plurality of unit delay stages 321_1, 321_2, . . . and 321_m. Thus, the delay part 321 may determine a delay time by which the inverted clock CLK_inv is to be delayed. Depending upon which unit delay stage the inverted clock CLK_inv is inputted, the delay part 321 may delay the inverted clock CLK_inv by the determined delay time, and output the output clock CLK_out.

The input selection part 322 may include the plurality of switches 322_1, 322_2, . . . and 322_m. The plurality of switches 322_1, 322_2, . . . and 322_m may be respectively coupled to the plurality of unit delay stages 321_1, 321_2, . . . and 321_m. The plurality of switches 322_1, 322_2, . . . and 322_m respectively may receive the plurality of bit signals CTRL_code<0>, CTRL_code<1>, CTRL_code<2>, . . . and CTRL_code<m> which are included in the control codes CTRL_code<0:m>. Accordingly, since only one bit signal is enabled among the plurality of bit signals CTRL_code<0>, CTRL_code<1>, CTRL_code<2>, . . . and CTRL_code<m>, only one switch may be turned on among the plurality of switches 322_1, 322_2, . . . and 322_m. The turned-on switch may input the inverted clock CLK_inv to the unit delay stage which is coupled to it.

At the same time the inverted clock CLK_inv as the output of the inverting control section 310 may be outputted as the output clock CLK_out through the delay part 321, the output clock CLK_out may be inputted as an input to the inverting control section 310. Accordingly, the delay time of the delay part 321 may determine the frequency of the output clock CLK_out. The delay time of the delay part 321 may be determined according to the control codes CTRL_code<0:m>.

In the clock generation circuit in accordance with the embodiment of the present invention, the frequency of an output clock may be determined according to the frequency of an input clock. Also, in the clock generation circuit in accordance with an embodiment of the present invention, since the frequency of the output clock may be determined according to control codes generated through the decoding operation of a control code generation unit, the frequency of the output clock may be changed by changing the decoding scheme of the control code generation unit. As a consequence, unlike a conventional clock generation circuit, the clock generation circuit in accordance with an embodiment of the present invention may be a digital control type clock generation circuit. The output clock may be generated by counting an oscillator signal and an input clock and coding a counted value. Therefore, unlike an analog control type conventional clock generation circuit, the frequency of the output clock may not be changed according to a variation in temperature, voltage and process. Further, it is possible to generate the output clock with a frequency desired by a designer.

While certain embodiments have been described above, it will be understood to those skilled in the art that the embodiments described are by way of example only. Accordingly, the clock generation circuit described herein should not be limited based on the described embodiments. Rather, the clock generation circuit described herein should only be limited in light of the claims that follow when taken in conjunction with the above description and is accompanying drawings.

What is claimed is:

1. A clock generation circuit comprising:
   a counting code generation unit configured to receive an input clock from an outside, to generate an oscillator signal during a period corresponding to the frequency of the input clock and to count the oscillator signal thereby generating counting codes when an enable signal is enabled;
   a control code generation unit configured to decode the counting codes and generate control codes; and
   a cycle changeable oscillation unit configured to generate an output clock, wherein a frequency of the output clock is determined in response to the control codes,
   wherein the oscillator signal is generated in an oscillator included in the counting code generation unit.

2. The clock generation circuit according to claim 1, wherein the counting code generation unit comprises:
   an oscillator enable signal generating section configured to generate an oscillator enable signal which has an enable period corresponding to the frequency of the input clock, when the enable signal is enabled;
   the oscillator configured to generate the oscillator signal in response to the enable signal and the oscillator enable signal; and
   a code generating section configured to count the oscillator signal and generate the counting codes.

3. The clock generation circuit according to claim 2, wherein the
   oscillator enable signal generating section comprises:
   a first counting part configured to count first codes in response to the input clock when the enable signal is enabled;
   a decoding part configured to decode the first codes and generate a decoding signal; and
   a signal generation part configured to enable the oscillator enable signal when the enable signal is enabled and disable the oscillator enable signal when the decoding signal is enabled.

4. The clock generation circuit according to claim 3, wherein the first counting part increases a code value of the first codes each time the input clock transitions to a specified level, when the enable signal is enabled.

5. The clock generation circuit according to claim 4, wherein the decoding part enables the decoding signal when the code value of the first codes is equal to or larger than a preset code value.

6. The clock generation circuit according to claim 3, wherein the counting code generation unit further comprises:
   a reset pulse generating section configured to generate a reset pulse when the oscillator enable signal is disabled.

7. The clock generation circuit according to claim 6, wherein the oscillator generates the oscillator signal when both the oscillator enable signal and the enable signal are enabled.

8. The clock generation circuit according to claim 7, wherein the code generating section comprises:
   a second counting part configured to count second codes in response to the oscillator signal; and
   a latch part configured to receive and latch the second codes when the oscillator enable signal is enabled, and output the second codes as the counting codes when the oscillator enable signal is disabled.

9. The clock generation circuit according to claim 8, wherein the second counting part initializes the second codes in response to the reset pulse.

10. The clock generation circuit according to claim 8, wherein the second counting part increases a code value of the second codes each time the oscillator signal transitions to a specified level.

11. The clock generation circuit according to claim 1,
    wherein the control codes comprise a plurality of bit signals, and
    wherein the control code generation unit decodes the counting codes and enables one bit signal among the plurality of bit signals.

12. The clock generation circuit according to claim 1, wherein the cycle changeable oscillation unit comprises:
    an inverting control section configured to invert the output clock when the enable signal is enabled, and output an inverted clock; and
    a variable delay section configured to determine a delay time in response to the control codes, delay the inverted clock by the determined delay time, and output the output clock.

13. The clock generation circuit according to claim 12, wherein the variable delay section comprises:
    a delay part having a plurality of unit delay stages which are coupled in series; and
    an input selection part configured to input the inverted clock to one unit delay stage among the plurality of unit delay stages in response to the control codes.

14. The clock generation circuit according to claim 13, wherein
    the input selection unit comprises a plurality of switches,
    the plurality of switches are coupled to respective input terminals of the plurality of unit delay stages, and
    only one switch among the plurality of switches is turned on in response to the control codes, and transfers the inverted clock to a unit delay stage which is coupled to it.

15. A clock generation circuit comprising:
    a counting code generation unit configured to receive an input clock from an outside, and to generate first codes and second codes in response to an oscillator signal and the input clock when an enable signal is enabled, and output the second codes as counting codes;
    a control code generation unit configured to decode the counting codes and generate control codes; and
    a cycle changeable oscillation unit configured to generate an output clock and to determine a delay time in response to the control codes, and generate an output clock which has a cycle corresponding to the determined delay time,
    wherein the counting code generation unit is configured to generate the second codes by counting the oscillator signal from when the enable signal is enabled to when a code value of the first codes is a preset code value,
    wherein the first codes are generated by counting the input clock, and the oscillator signal is generated by an oscillator included in the counting code generation unit.

16. The clock generation circuit according to claim 15, wherein the counting code generation unit increases the code value of the first codes each time the input clock transitions to a specified level when the enable signal is enabled, increases a code value of the second codes each time the oscillator signal transitions to a specified level when the enable signal is enabled, and outputs the second codes as the counting codes when the code value of the first codes is the preset code value.

17. The clock generation circuit according to claim 16, wherein the counting code generation unit comprises:

a first counting part configured to increase the code value of the first codes each time the input clock transitions to the specified level when the enable signal is enabled;

a decoding part configured to decode the first codes and enable a decoding signal when the code value of the first codes is the preset code value;

an oscillator enable signal generation part configured to enable an oscillator enable signal when the enable signal is enabled, and disable the oscillator enable signal when the decoding signal is enabled;

the oscillator configured to generate the oscillator signal when both the enable signal and the oscillator enable signal are enabled;

a second counting part configured to increase the code value of the second codes each time the oscillator signal transitions to the specified level; and a latch part configured to latch the second codes when the oscillator enable signal is enabled, and output the second codes as the counting codes when the oscillator enable signal is disabled.

18. The clock generation circuit according to claim 17, wherein the counting code generation unit further comprises:

a reset pulse generating section configured to generate a reset pulse when the oscillator signal is disabled, and wherein the latch part initializes the code value of the second codes which are latched, when the reset pulse is inputted thereto.

19. The clock generation circuit according to claim 15, wherein the cycle changeable oscillation unit comprises:

an inverting control section configured to invert the output clock when the enable signal is enabled, and output an inverted clock; and a variable delay section configured to determine a delay time in response to the control codes, delay the inverted clock by the determined delay time, and output the output clock.

20. A clock generation system comprising:

a counting code generation unit configured to receive an input clock from an outside, to count an oscillator signal during a period corresponding to the frequency of the input clock, thereby generating a counting code;

a control code generation unit configured to generate bit signals; and a cycle changeable oscillation unit configured to generate an output clock in response to the bit signals, wherein the oscillator signal is generated in an oscillator included in the counting code generation unit.

* * * * *